Figure 1:
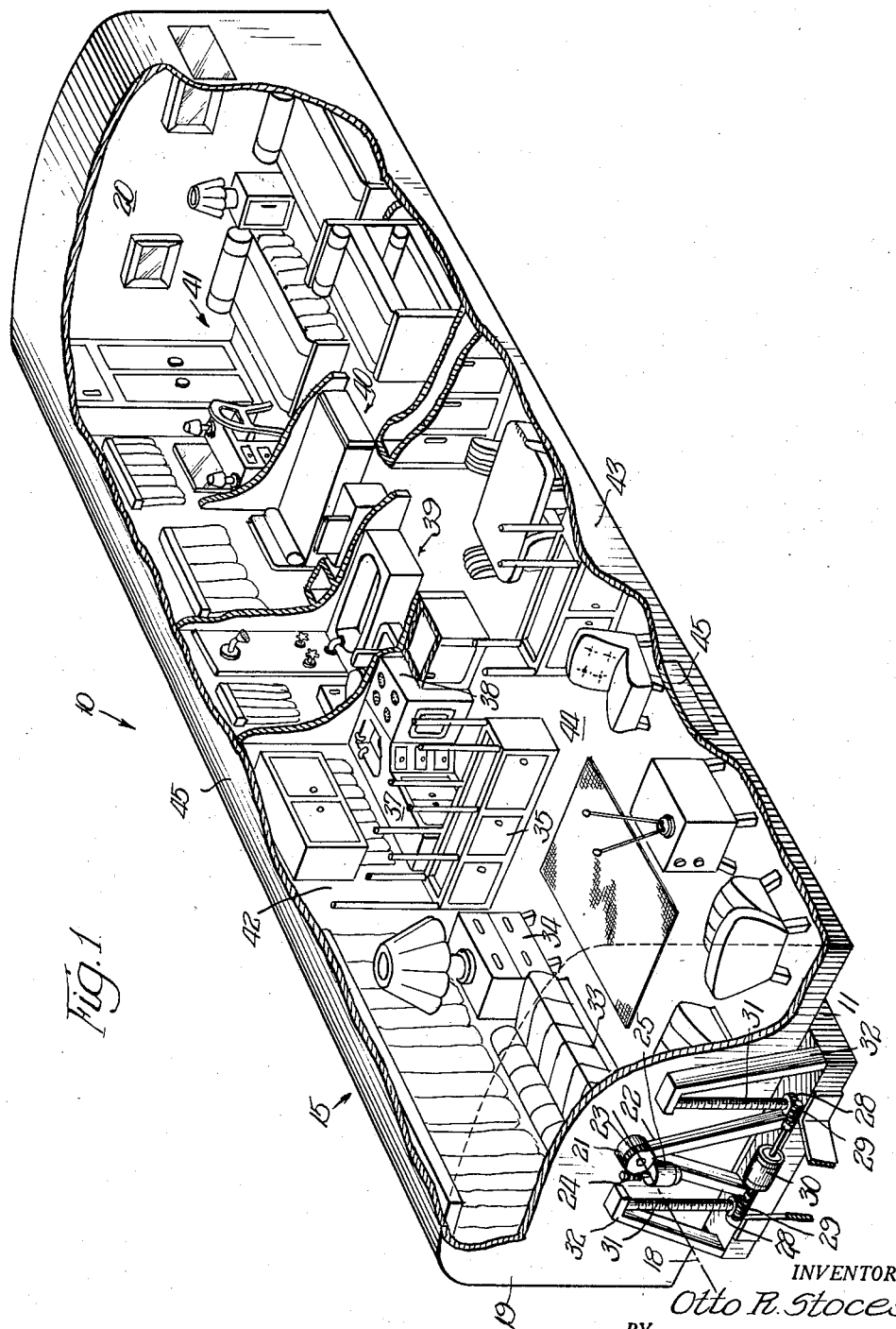

July 29, 1958  O. R. STOCES  2,845,298
TILTABLE HOUSE TRAILER CONSTRUCTION
Filed April 20, 1956  2 Sheets-Sheet 1

INVENTOR.
Otto R. Stoces,
BY Robert R. Lockwood
Atty.

July 29, 1958          O. R. STOCES          2,845,298
TILTABLE HOUSE TRAILER CONSTRUCTION
Filed April 20, 1956          2 Sheets-Sheet 2
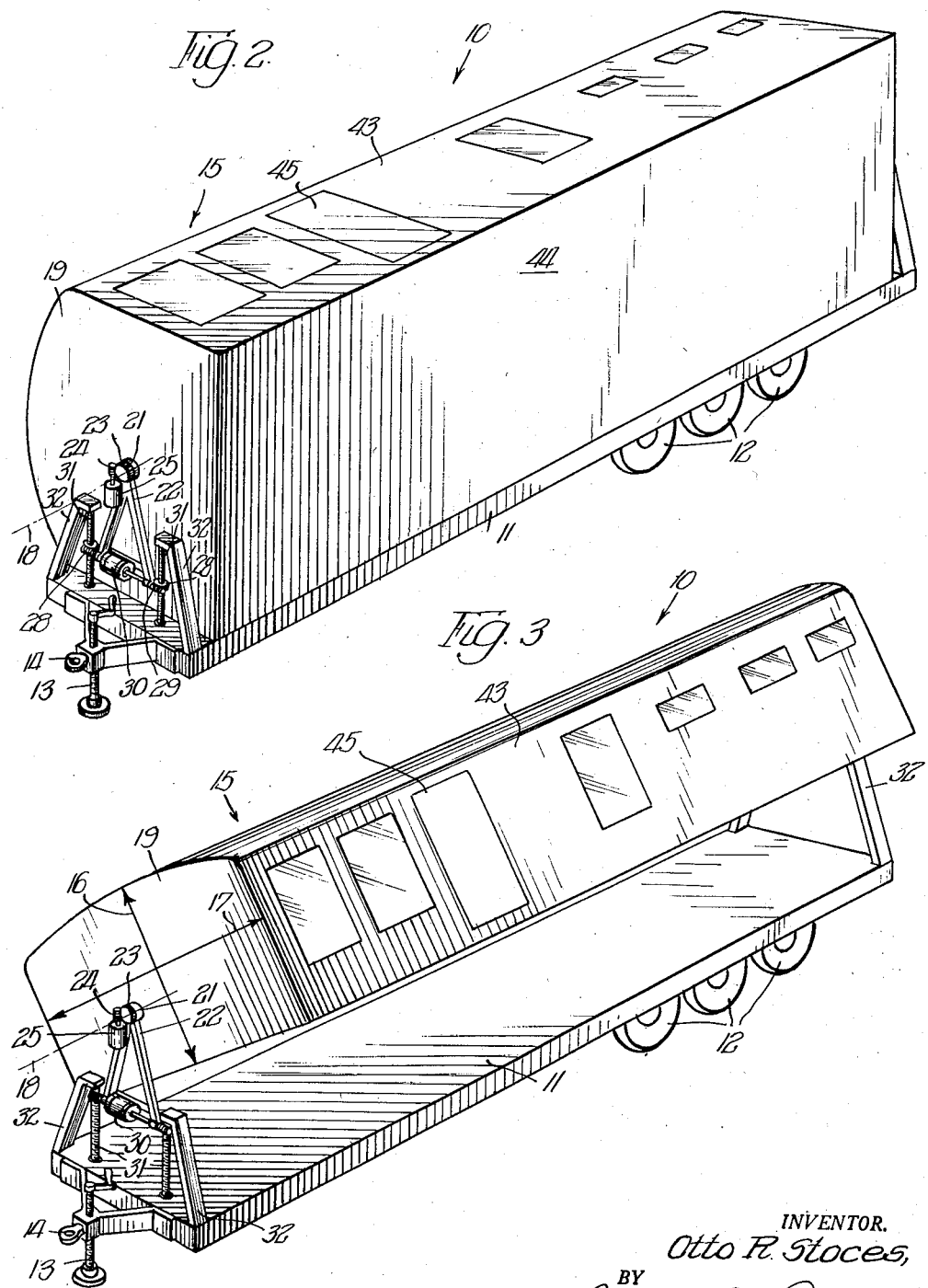
INVENTOR.
Otto R. Stoces,
BY
Robert R. Lockwood
atty.

United States Patent Office 2,845,298
Patented July 29, 1958

2,845,298
TILTABLE HOUSE TRAILER CONSTRUCTION

Otto R. Stoces, Chicago, Ill.

Application April 20, 1956, Serial No. 579,553

6 Claims. (Cl. 296—35)

This invention relates generally to the construction of vehicles and it has particular relation to house trailers.

The maximum vehicle width legally permitted on the public highways in the United States is eight feet. The maximum height is limited, as a practical matter, only by the height of tunnels, bridges and the like likely to be encountered. Such height is substantially greater than the eight foot legally permissible width. This width limitation is a definite handicap in the construction of vehicles for use on public highways.

The disadvantage of this width limitation is particularly apparent in the construction of house trailers. With an overall legal width of only eight feet, the accommodations that can be provided in such a trailer are correspondingly limited. The length must be increased with the result that a long and narrow configuration results which does not lend itself to the desired convenience. For such a construction the furnishings are narrow and the arrangement along the sides must be such as to provide an aisle therebetween. When two or more persons use the trailer, care must be taken to avoid congestion.

A double deck construction can be used. However, it is limited in width as above indicated. Moreover, it is relatively expensive since the construction must be such as to support adequately the second story. There is the further disadvantage that stairs must be provided and a person must go up and down them in traveling from one deck to another.

Accordingly, among the objects of this invention are: To provide for substantially increasing the width of a trailer body and still permit the legal use thereof along public highways; to construct a trailer body having a height not exceeding the legally permissible width and a width substantially in excess of the height and provide for rotating the trailer body about a longitudinal axis from its normal horizontal position to a vertical position for transportation purposes; to provide for elevating the trailer body in order to facilitate rocking it from one position to the other; and to locate the major portion of the fixed house furnishings along the wall of the trailer body that is lowermost when it is rocked to the vertical position.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 is a perspective view of a house trailer in the normal operative position, portions of the walls and top having been broken away in order to show the contents;

Figure 2 is a perspective view showing the arrangement of the trailer body, illustrated in Figure 1, at a smaller scale and arranged in the transporting position; and Figure 3 is a perspective view illustrating the position of the trailer body intermediate its positions as shown in Figures 1 and 2 and showing how it is rocked from one position to another either for transportation purposes or for normal use.

Referring now to the drawings, it will be observed that the reference character 10 designates, generally, a house trailer that is arranged to be moved along the public highways where the legally permissible width is eight feet. A transporting frame or bed 11 is provided with suitable wheels 12. For illustrative purposes three sets of wheels 12 have been shown. It will be understood that a greater or lesser number of sets can be used and that wheels can be provided under both ends of the frame or bed 11. At the forward end a jack 13 is provided for holding this end in elevated position where the wheels 12 are provided only at the rear end. In addition a towing eye 14 is provided to permit the house trailer 10 to be attached to a towing vehicle or tractor as is readily understood.

Mounted on the transporting frame or bed 11 is a trailer body that is indicated, generally, at 15. As pointed out the maximum width of the trailer body 15 for transportation purposes is eight feet. However, there is no such limitation on the height.

In accordance with this invention the height of the trailer body 15, as indicated at 16, may be of the order of eight feet or less but not exceeding the legally permissible width of the trailer body 15 in the transporting position. Also in accordance with this invention the width, as indicated at 17, may be of the order of ten to thirteen feet which is substantially in excess of the width permitted for transportation purposes.

Further in accordance with this invention provision is made for rocking the trailer body 15 about a longitudinal axis 18 to the end that in the transportation position of the trailer body 15, as shown in Figure 2, the maximum width will not exceed the legally permissible eight feet.

Provision is made for rockably mounting the trailer body 15 on the end walls 19 and 20. As illustrated in the drawings provision is made at 21 on these end walls for rotatably mounting the trailer body 15 about the longitudinal axis 18. The mounting means is carried by a frame 22 and through the agency of gears 23 and worms 24, actuated by an electric motor 25, the trailer body 15 can be rocked from the normal operative position shown in Figure 1 to the transportation position Figure 2 or vice versa.

With a view to facilitating the rocking movement of the trailer body 15 from one position to another, provision is made for elevating it with respect to the transporting frame or bed 11. For this purpose gears 28 are employed and they are rotatably mounted on the lower ends of the frames 22. Cooperating worms 29 are driven by electric motors 30 to rotate the gears 28 along elevating screws 31 which extend between the transporting frame or bed 11 and the inturned ends of brackets 32 which extend upwardly, as shown, from the frame or bed 11.

It will be understood that the electric motors 30 first are energized to raise the trailer body 15 to the elevated position, as shown in Figure 3, and then the motors 25 are energized to rock the trailer body 15 in one direction or the other depending upon whether it is to be placed in the normal operative position or in the transporting position. While electric motors 25 and 30 have been illustrated for rocking the trailer body 15, it will be understood that other power actuating devices can be employed. For example, air operated mechanisms can be used. Also mechanisms using hydraulic liquid can be employed for rocking the trailer body 15.

The disposition of the fixed house furnishings within the trailer body 15 is important. These furnishings include a sofa 33, a chest 34, a planter 35, a cupboard 36 above a kitchen sink cabinet 37, a stove 38, bathroom fixtures shown generally at 39, and bedroom furniture shown generally at 40 and 41. Preferably these fixed house furnishings are positioned commonly along a wall 42 which is lowermost when the trailer body 15 is in the transporting position as shown in Figure 2. The remaining house furnishings are positioned generally along the opposite wall 43. However, some or all of them can be movable. Prior to shifting the trailer body 15 from the normal horizontal position to the vertical transporting position, the movable house furnishings along the wall 43 are moved bodily into close proximity with the wall 42 and may be turned through 90° so that, when the trailer body 15 is in the vertical position, they will be upright. As may be desired, some of the furnishings along the wall 43 can be anchored to the floor 44 of the trailer body 15.

The entrance door is indicated at 45. In the normal horizontal position the door 45 in the wall 43 permits ready access to the interior of the trailer body 15. When the trailer body 15 has been rocked to the transportation position, Figure 2, the door 45 is located in the uppermost wall. However, provision can be made for opening the door 45 in this position and entering the interior of the trailer body 15 in order to place the movable furnishings in proper position for traveling.

When the trailer body 15 is rocked to the transportation position, Figure 2, the longitudinal axis 18 about which it is rocked preferably is located above the center of gravity of the trailer body 15 and the furnishings therein. If desired, the longitudinal axis 18 can be located midway between the top or roof 46 and the floor 44. Since the major portion of the house furnishings are located along the wall 42, the longitudinal axis 18 is positioned substantially closer to the wall 42 than it is to the wall 43.

Since certain further changes can be made in the foregoing construction and different embodiments of the invention can be made without departing from the spirit and the scope thereof, it is intended that all matter shown in the accompanying drawings and described hereinbefore shall be interpreted as illustrative and not in a limiting sense.

What is claimed as new is:

1. A house trailer comprising, in combination, a horizontal transporting frame having a width not exceeding the legally permissible width for transport along a public highway, an elongated trailer body normally mounted on said frame and having a generally rectangular cross section with a height not exceeding said width and a width substantially in excess of such permissible width, and means rockably mounting said trailer body on said transporting frame about a longitudinal axis whereby for transportation purposes it can be positioned substantially at right angles to its normal operative position.

2. A house trailer comprising, in combination, a horizontal transporting frame having a width not exceeding the legally permissible width for transport along a public highway, an elongated trailer body normally mounted on said frame and having a generally rectangular cross section with a height not exceeding said width and a width substantially in excess of such permissible width, means rockably mounting said trailer body on said transporting frame about a longitudinal axis whereby for transportation purposes it can be positioned substantially at right angles to its normal operative position, and means for elevating said trailer body above said transporting frame to facilitate rocking of said body from one position to another.

3. A house trailer comprising, in combination, an elongated trailer body having a generally rectangular cross section with a height no greater than the maximum vehicle width permitted along a public highway and a width substantially greater than said vehicle width, a wheeled bed for carrying said trailer body and rockably mounting the same about a longitudinal axis for movement between its normal horizontal position offset laterally from the longitudinal centerline of said bed and a vertical transporting position, and means on said bed for raising said trailer body to facilitate its movement between said positions.

4. A house trailer comprising, in combination, an elongated trailer body having a generally rectangular cross section with a height no greater than the maximum vehicle width permitted along a public highway and a width substantially greater than said vehicle width, a wheeled bed for carrying said trailer body and rockably mounting the same about a longitudinal axis substantially midway its top and bottom and substantially nearer one side than the other for movement between its normal horizontal position and a vertical transporting position with said one side lowermost, and means on said bed for raising said trailer body to facilitate its movement between said positions.

5. A house trailer comprising, in combination, a transporting frame having a width not exceeding that permitted for use along a public highway, a trailer body having a height not exceeding said width and a width substantially in excess of said permitted width and provided with the major portion of the normally fixed house furnishings along one side, means at each end of said frame rockably mounting said body about a longitudinal axis from its normal horizontal position to a vertical position with said one side lowermost, means for rocking said body from one position to the other, elevating means at each end of said frame for raising and lowering said body, and means for operating said elevating means to raise said body for movement between said positions and for lowering it after completion of such movement.

6. A house trailer comprising, in combination, a transporting frame having a width not exceeding that permitted for use along a public highway, a trailer body having a height not exceeding said width and a width substantially in excess of said permitted width and provided with the major portion of the normally fixed house furnishings along one side, means at each end of said frame rockably mounting said body about a longitudinal axis substantially midway its top and bottom and substantially nearer one side than the other for movement from its normal horizontal position to a vertical position with said one side lowermost, means for rocking said body from one position to the other, elevating means at each end of said frame for raising and lowering said body, and means for operating said elevating means to raise said body for movement between said positions and for lowering it after completion of such movement.

References Cited in the file of this patent

UNITED STATES PATENTS

| | | |
|---|---|---|
| 2,350,841 | Troche et al. | June 6, 1944 |
| 2,463,647 | Schuette | Mar. 8, 1949 |

FOREIGN PATENTS

| | | |
|---|---|---|
| 812,367 | Germany | Aug. 30, 1951 |